Fig.1

Sept. 23, 1941.　　　G. O. JOYNER ET AL　　　2,256,903
VARIABLE SPEED TRANSMISSION
Filed April 13, 1940　　　8 Sheets-Sheet 2

Fig. 2

INVENTOR.
George O. Joyner and Donald Scott Myers
BY
Roy M. Eilers
ATTORNEY.

Sept. 23, 1941.    G. O. JOYNER ET AL    2,256,903
VARIABLE SPEED TRANSMISSION
Filed April 13, 1940    8 Sheets—Sheet 3

INVENTOR.
George O. Joyner and Donald Scott Myers
BY
Roy M. Eilers
ATTORNEY.

Sept. 23, 1941.   G. O. JOYNER ET AL   2,256,903
VARIABLE SPEED TRANSMISSION
Filed April 13, 1940   8 Sheets-Sheet 4

INVENTOR.
George O. Joyner and Donald Scott Myers
BY
Roy M. Eilers
ATTORNEY.

Sept. 23, 1941.  G. O. JOYNER ET AL  2,256,903
VARIABLE SPEED TRANSMISSION
Filed April 13, 1940   8 Sheets—Sheet 6

INVENTOR.
George O. Joyner and Donald Scott Myers
BY
Roy M. Eilers
ATTORNEY.

Sept. 23, 1941.  G. O. JOYNER ET AL  2,256,903
VARIABLE SPEED TRANSMISSION
Filed April 13, 1940  8 Sheets-Sheet 7

Fig. 10

George O. Joyner and Donald Scott Myers INVENTOR.
BY
Roy M. Eilers
ATTORNEY.

Patented Sept. 23, 1941

2,256,903

UNITED STATES PATENT OFFICE 2,256,903

VARIABLE SPEED TRANSMISSION

George O. Joyner and Donald Scott Myers,
St. Louis, Mo.

Application April 13, 1940, Serial No. 329,465

6 Claims. (Cl. 74—115)

This invention relates to improvements in variable speed transmissions. More particularly, the invention relates to variable speed transmissions, wherein the power impressed on the driving shaft is applied intermittently to the driven shaft.

It is an object of the invention to provide a variable speed transmission of simple and efficient construction, which will provide a large range of speeds.

There are a number of variable speed transmissions in existence, most of which require the shifting of gears to vary the speed ratio between the input and output shafts of the transmission. The use of gears to vary the speed ratio between the input and output shafts of a transmission requires gear-shifting means and a friction clutch. This increases the cost of power transmission and requires the exercise of a certain amount of skill by the operator. Power transmissions making use of gear shifting are, therefore, not as desirable as a transmission wherein speed changes are obtained merely by movement of a lever. Some transmissions have been made and used which provide for the varying of the speed ratio between the input and output shafts of a transmission merely by the movement of a lever, but the speed ranges of these devices have been seriously limited. The invention provides a lever-operated variable speed transmission that will give output shaft speeds from one revolution per minute to crankshaft speed or greater. It is therefore, an object of the invention to provide a variable speed transmission controlled by a single lever, which will give output speeds from one revolution per minute to crankshaft speeds or greater.

Other objects and advantages of the invention will be shown and described in the drawings and accompanying description.

In the drawings, we show two preferred embodiments of our invention, but we do so only for the sake of convenience, and it is to be understood that the drawings and accompanying description do not limit the invention and that the invention will be defined by the appended claims.

Referring to the drawings in detail, the first embodiment of the invention may be regarded as the aggregation of a number of elements. These elements may roughly be designated as a casing, a driving mechanism, a drum, and a floating shaft. The casing comprises a main section 22, end plates 16 and 18, and end mounting 14. The end plates 16 and 18 and the end mounting 14 are secured to the main section 22 by bolts 20. The driving mechanism is mounted on drive shaft 12 and is rotatable therewith. The driving mechanism comprises a collar 24 and a cam 50. The drive shaft 12 is journaled in bearing 15 in end plate 16 and is rotatably supported in rotatable shaft 10. The collar 24 is so associated with the shaft 12 that the collar 24 may be moved longitudinally on the shaft 12, while the collar and shaft rotate together. This association can be secured in a number of ways, but the present embodiment uses a shaft having flat portions milled thereon, and a collar having a hub section complementary to the cross-section of the shaft. The collar 24 has a groove 26 in its outer periphery in which a ring 28 is held. The engagement between the ring 28 and the groove 26 is loose enough to permit rotation of the collar 24 without rotation of the ring 28. The ring 28 is secured to a lever 30 by pins 32. The lever 30 is rotatably attached to the main section 22 of the casing by a stud and pin 23. The free end of lever 30 extends through the main section 22 of the casing and may be operated by manual or other means not shown. The collar 24 is provided with an inclined inner face or surface 25. This inclined face 25 engages one arm of lever 34. Lever 34 has a rounded portion which fits in a groove in shaft 12 and acts as a fulcrum for lever 34. A lever 36 is attached to lever 34 by pin 38. The lever 36 is connected to a movable counterbalancing weight 40 by pin 39. A lever 44, connected to lever 34 by pin 46, bears against the inner surface of cam 50. The lever 44 in this embodiment of the invention consists of two parts held together by pins 45 and 46. Secured to cam 50 by suitable means, such as machine screws 48, is a cam plate 52. In the central portion of the cam plate 52 is a longitudinal opening. This opening is so dimensioned that the sides thereof engage flat portions milled on the shaft 12 and cause the cam to rotate with the shaft. The opening is long enough to permit the movement of cam 50 in a plane perpendicular to the axis of shaft 12. This permits the eccentricity of the cam to be changed at will. Grooves may be machined in the cam plate 52 to serve as guides for the counterbalancing weight 40. Projections 42 on the counterbalancing weight 40 engage the grooves in the cam plate 52, and guide the movement of the counterbalancing weight 40 relative to the cam plate 52. The cam has two bearing surfaces 54 and 56. These bearing surfaces engage rollers 58 and 60 which are mounted on shaft 62. Shaft 62 is rigidly connected to rocker arm 64 and rotates therewith. A shaft 66 and a cam 68 are also rigidly attached to the rocker arm 64. The shaft 66 and the cam 68 are positioned in drum 84 and oscillate with the rocker arm 64. The shaft 66 is journaled in bearings 70 in the end plates of drum 84. The cam 68 has a socket machined in it which receives a lever 72 that is rotatably connected to driving shoe 76 by a pin 74. Springs 78 engage shoe 76 and cam 68, and tend to hold the adjoining edges of the shoe and cam parallel to each other. The cam 68 and shoe 76 are positioned inside of a gear 80. The gear 80 has gear teeth on the outer periphery and a driving surface on its inner periphery. The gear 80 is mounted in drum 84 and engages the central gear 82 which is rigidly attached to rotatable shaft 10. The drum 84 which comprises two end plates held together by spacer 83 and nut and bolt 85 is rotatable with respect to the casing 22 and also rotatable with respect to the shaft 10. Bearings 86 and 87 in the end plates of drum 84 permit the shaft 10 to rotate independently of the drum 84. Bearing 88 in end plate 18 of the casing 22 permits the drum 84 to rotate independently of the casing. Rigidly attached to the drum 84 and rotatable therewith is a sleeve 90 to which bearing 86 may be attached. A gear 92 and a brake drum 94 are rigidly secured to sleeve 90 and rotate therewith. The gear 92 engages a gear 122, which is an element of the device to be driven by the transmission. The shaft 10 is rotatably supported by bearing 13 in end mounting 14, by bearings 86 and 87 in the end plates of drum 84, and by the hollow portion of shaft 12. The central gear 82, a gear 96 and a brake drum 98 are all rigidly secured to the shaft 10 and rotate therewith. The gear 96 engages a gear 120, which is an element of the device to be driven by the transmission.

Figure 1:
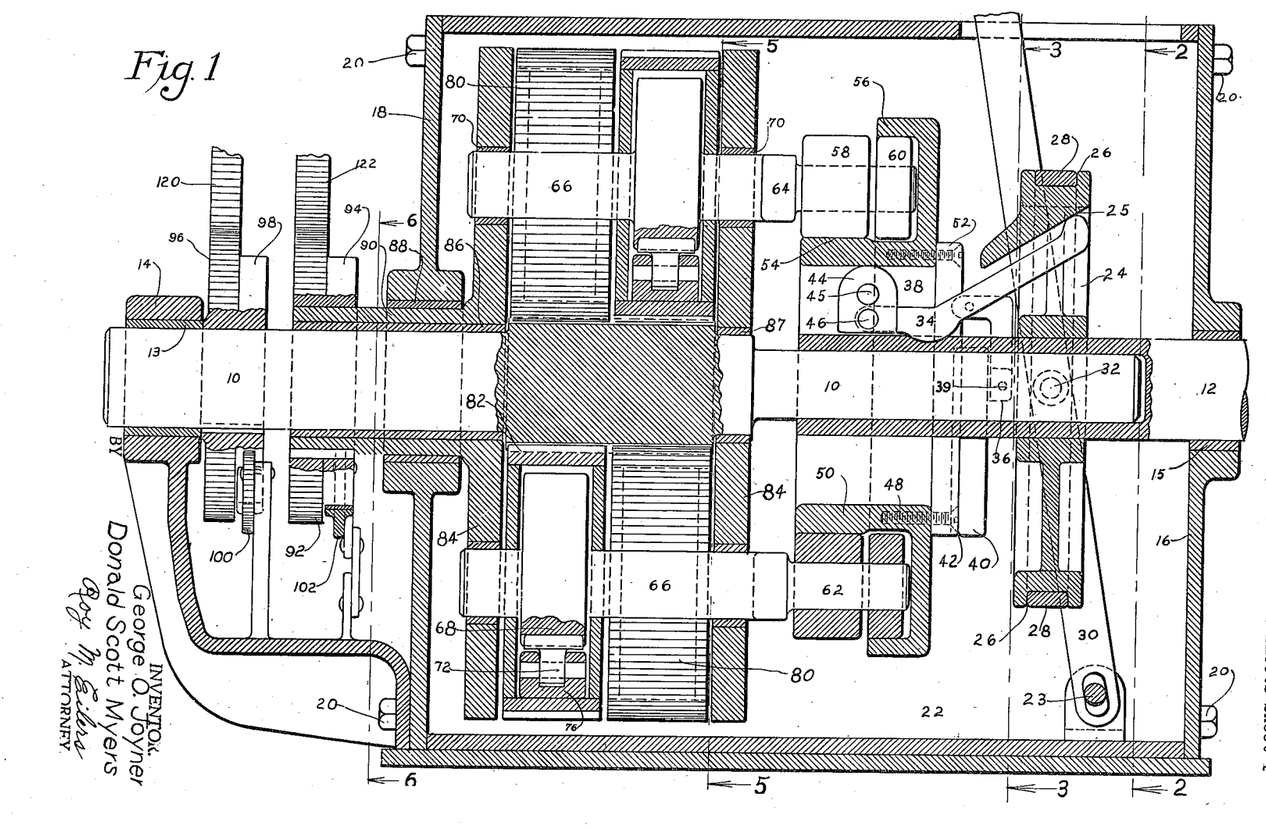
Fig. 1 of the drawings is a view of the elements of one preferred form of variable speed transmission as they are assembled in operative relation.
Figure 2:
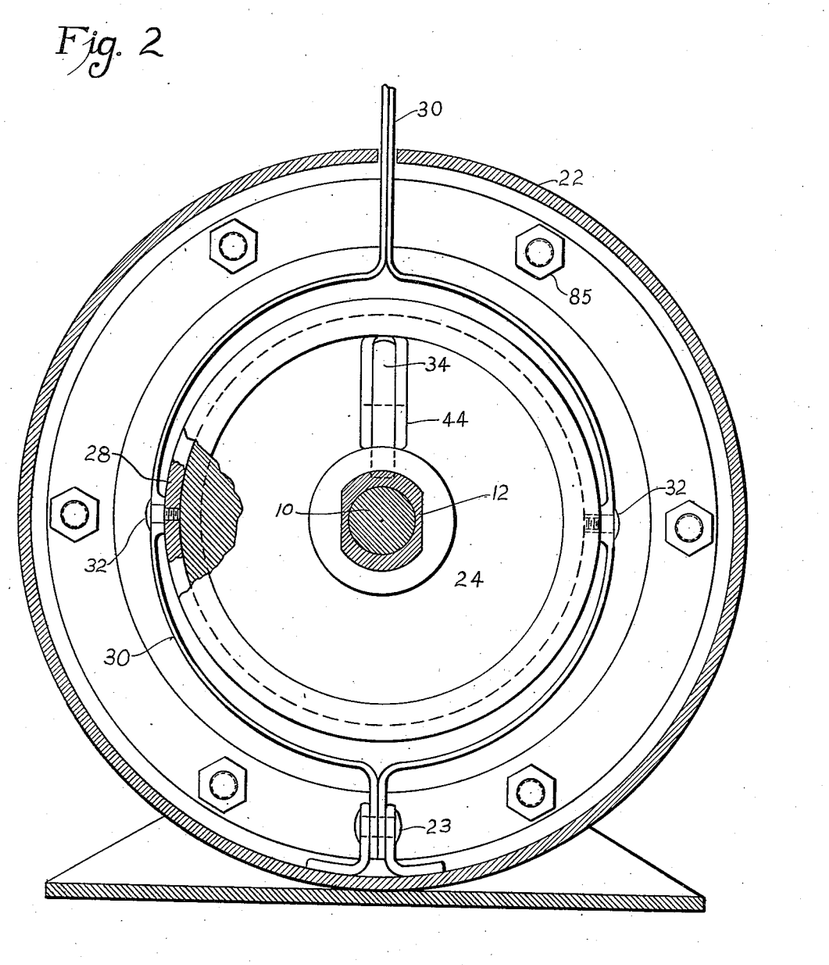
Fig. 2 is a cross-sectional view of an element of the transmission taken along the plane 3—3 indicated in Fig. 1.
Figures 3, 4:
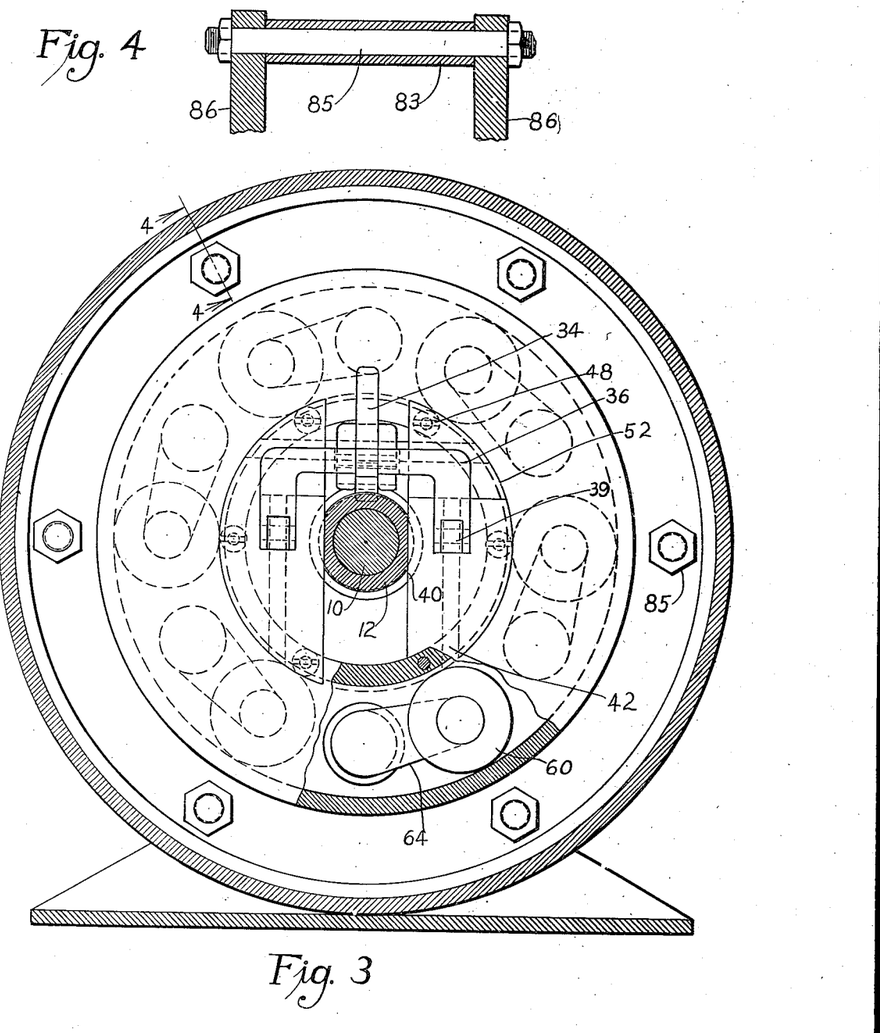
Fig. 3 is a cross-sectional view of an element of the transmission taken along the plane 2—2 indicated in Fig. 1.
Fig. 4 is a cross-sectional view of a part of the element of the transmission shown in Fig. 3 taken along the plane 4—4 indicated in Fig. 3.
Figure 5:
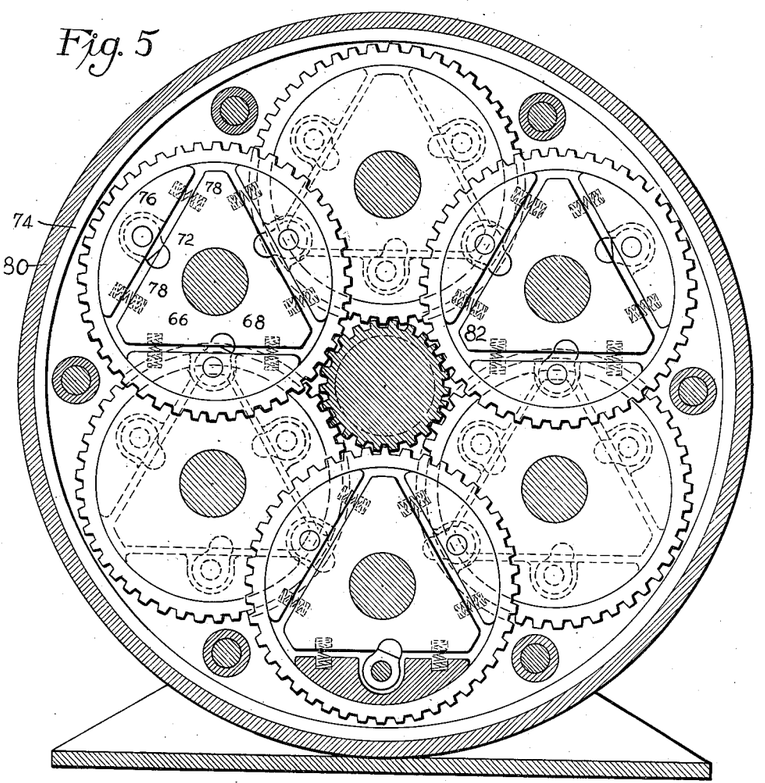
Fig. 5 is a cross-sectional view of an element of the transmission taken along the plane 5—5 indicated in Fig. 1.
Figure 6:
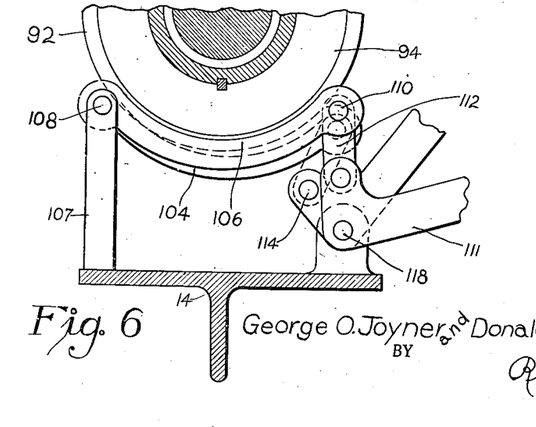
Fig. 6 is a partial cross-sectional view of an element of the transmission taken along the plane 6—6 indicated in Fig. 1.

Brakes 100 and 102 are secured to end mounting 14, and engage brake drums 98 and 94 respectively. The brakes consist of a brake arm 104 to which a lining 106 is secured. The brake arm 104 is pivotally secured to a projection 107 on the end mounting 14 by a pin 108. The other end of the brake arm 104 is pivotally connected to lever 112 by a pin 110. The lever 112 is connected to the brake operating lever 111 by a pin 114. The brake operating lever 111 is connected to the end mounting 14 by a pin 118.

The second embodiment of the invention that is shown in the drawings may also be considered roughly as the aggregation of a number of elements. These elements may be designated as a casing, rotatable drums, cams and the driven shaft. The casing comprises a main body section 124 and end plates 126 and 128. Bearings 130 and 132 are mounted in end plates 126 and 128 respectively. A drive shaft 134 is rigidly connected to rotatable drums 136 and 138. Each rotatable drum comprises two end plates that are held together by spacers 135 and nuts and bolts 137. The rotatable drums 136 and 138 are rigidly connected by a sleeve 139 in such manner that the two form a unit and rotate as such. The rotatable drums 136 and 138 are supported by bearing 132 in end plate 128 and bearing 140 which is mounted in the drum 138. The driven shaft 178 is supported by bearing 130 in end plate 126 and by bearing 142 which is mounted in drum 136. The rotatable drums 136 and 138 contain a number of gears 144 that engage central gears 146, which are rigidly attached to the driven shaft 178. Positioned in the gears 144 are cams 148 that are rigidly connected to shafts 150. Also positioned in the gears 144 are driving shoes 145 and levers 147. The driving shoes 145 engage the inner periphery of gear 144 and the levers 147 engage recesses in cam 148. The shafts 150 are rigidly attached to rocker arms 152 and rotate therewith. Each rocker arm 152 is rigidly connected to shaft 154 on which rollers 156 and 158 are rotatably mounted. The rollers 156 and 158 engage the bearing faces 160 and 162 respectively of cams 164 and 166. The cams have central sections in which longitudinal openings 168 are made. These openings are so dimensioned that their sides engage guides 170 which are rigidly connected to the main body section 124 of the casing by struts 171. The central sections of the cams 164 and 166 have an opening 172, through which the shaft 178 and the sleeve 139 extend. Cams 164 and 166 respectively are provided with extensions 174 and 176 which extend through the main body section 124 of the casing. The driven shaft 178 has central gears 146 rigidly attached to it, and is connected by suitable means to the device to be driven by the transmission.

The principle of operation of the invention is the intermittent application of power to a rotating member. In the preferred embodiments of the invention that are shown in the drawings, the drive is secured by shoes which are intermittently applied to a driving surface by the action of a rocker arm. The drive may also be secured by use of over-running or step-by-step clutches since these and the clutch shown in the drawings are interchangeable. The rocker arm that actuates the shoes is actuated by a cam having a variable eccentricity. The design of the transmission is such that, with a constant speed at the input, the rocker arm is oscillated the same number of times per minute. The change of eccentricity of the cam changes the amplitude of oscillation of the rocker arm and the amount of travel of the driving shoes. Since the rocker arm and the driving shoes have the same number of oscillations per minute, changes in the amplitude of oscillation will affect the speed of the device. This can be appreciated when it is realized that all oscillations of the shoes must be completed in the same time. It is obvious, therefore, that the driving surface must be moving faster with a longer oscillation than it would be with a short oscillation, since both oscillations require the same time.

The oscillation of the rocker arms in the first preferred embodiment is caused by the eccentricity of the driving cam 50. The driving cam 50 is a circular cam which may rotate eccentrically or concentrically with respect to the axis of drum 84. When cam 50 rotates concentrically, no force is transmitted from the driving shaft to the driven shaft, and the two shafts may rotate independently. When cam 50 rotates eccentrically, the cam followers will move back and forth and cause the rocker arms to oscillate. Cam 50 is provided with two bearing surfaces 54 and 56. Surface 54 causes the rollers on shaft 62 to move outwardly, while surface 56 causes the rollers on shaft 62 to move inwardly. These surfaces make cam 50 a positive follower cam. When the cam is moved by levers 34 and 44, which are actuated by movement of collar 24, one portion of its periphery will be farther from the center of the shaft than other portions. As this portion of the cam moves in its orbit, the shafts 62 will move outwardly. This outward movement of shaft 62 causes the rotation of rocker arms 64 which are connected to and rotate with shafts 66 and cam 68. The rotation of cam 68 causes the actuation of levers 72. These levers are rotatably secured to shoes 76 and engage recesses in cam 68 in such manner that the rotation of cam 68 causes the shoes 76 to move outward from the cam in opposition to springs 78. Since the shoes 76 and the cam 68 are situated within gear 80, the initial rotation of cam 68 forces shoes 76 into contact with the driving surface of gear 80, and the continued rotation of cam 68 causes gear 80 to rotate. As the low portion of the periphery of the cam moves in its orbit, the shaft 62 is forced to move inwardly and rotates the rocker arm 64, shaft 66, and cam 68 in the opposite direction. Rotation of cam 68 in the opposite direction permits shoes 76 to move inwardly toward the cam 68 under the influence of springs 78 and permit free rotation of gear 80. It can be seen that, as the high point on the periphery of the cam moves in its orbit and is followed by the low point on the periphery of the cam, the rocker arms 64 and cams 68 rotate first in one direction and then in the other. The cams 68, levers 72, and shoes 76 are so arranged that rotation in one direction drives the gears 80, while rotation in the other direction permits the gears 80 to rotate without interference.

The eccentricity of the cam 50 is adjusted by movement of lever 30. The lever 30 is pivotally connected to a ring 28 which engages a groove 26 in collar 24. As the lever is moved, the collar 24 slides along the shaft 12, and this can be done while the shaft 12 is rotating. The movement of collar 24 causes the inclined face 25 thereon to engage the end of lever 34, and continued movement of the collar 24 causes rotation of the lever 34. The rotation of lever 34 displaces the cam 50 and displaces the counterweight 40. The counterweight 40 is so designed that any movement of the cam 50 is compensated for automatically by movement of the counterweight 40, and constant dynamic balance is maintained.

The eccentricity of the cam 50 causes the rocker arm to oscillate and the cams 68 to oscillate. A large amount of eccentricity of the cam 50 causes a large amplitude of oscillation, while a small amount of eccentricity causes a small amplitude of oscillation. Since all the oscillations take the same amount of time, the large oscillations that result from a large amount of eccentricity result in increased speed at the output.

Forward and reverse drive may be obtained in the first preferred embodiment of the invention by braking either the drum 84 or the shaft 10. Gears are mounted on the shaft 10 and the extension 90 and engage gears in the device to be driven. By applying or releasing brakes 100 and 102, forward or reverse motion of the device to be driven can be obtained.

Figure 7:
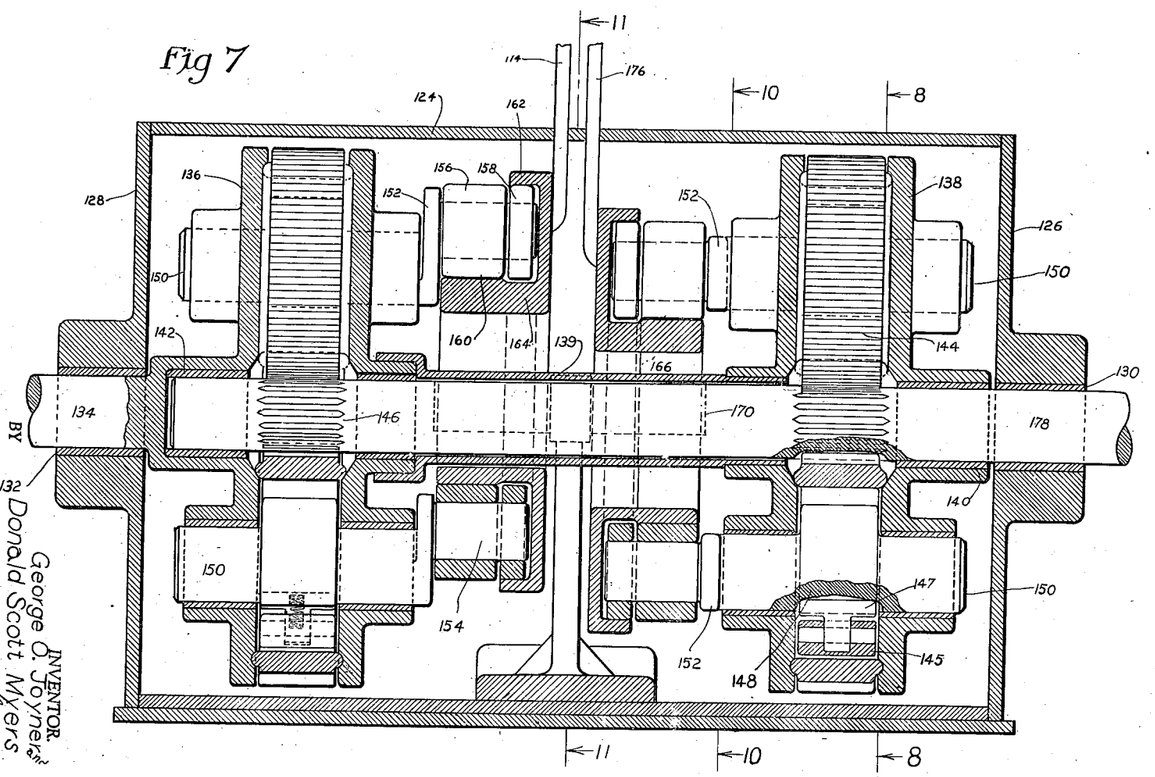
Fig. 7 is a view of the elements of another preferred form of variable speed transmission, that shows the elements of the transmission as they are assembled in operative relation.
Figure 8:
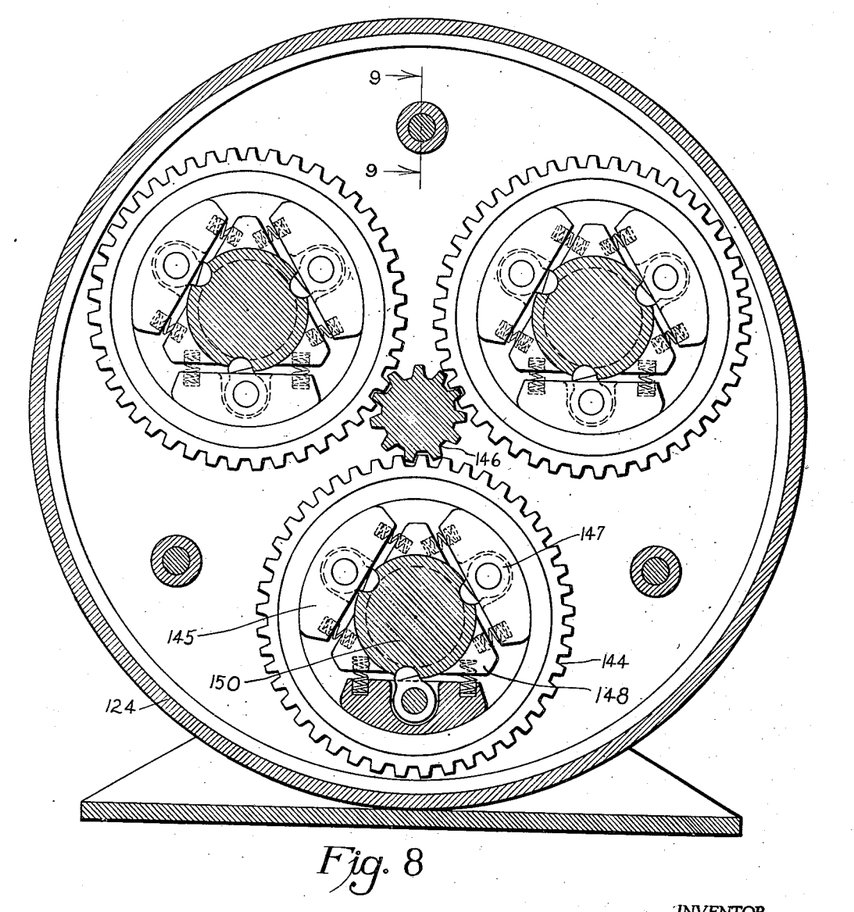
Fig. 8 is a cross-sectional view of an element of the transmission taken along the plane 8—8 indicated in Fig. 7.
Figure 9:
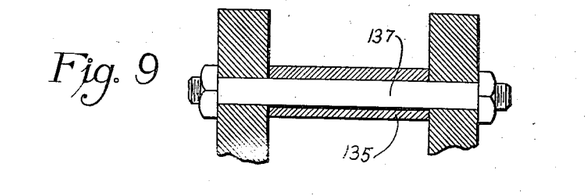
Fig. 9 is a cross-sectional view of a part of the element of the transmission shown in Fig. 8 taken along the plane 9—9 indicated in Fig. 8.
Figure 10:
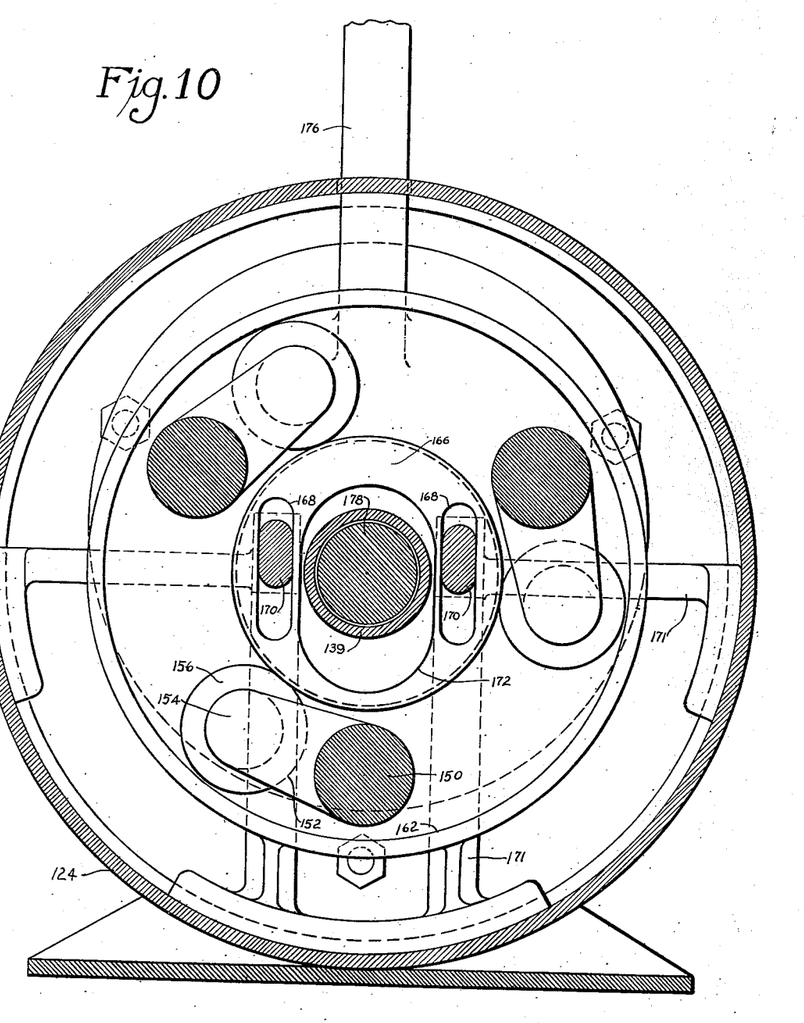
Fig. 10 is a cross-sectional view showing some of the elements of the transmission and is taken along the plane 10—10 indicated in Fig. 7.
Figure 11:
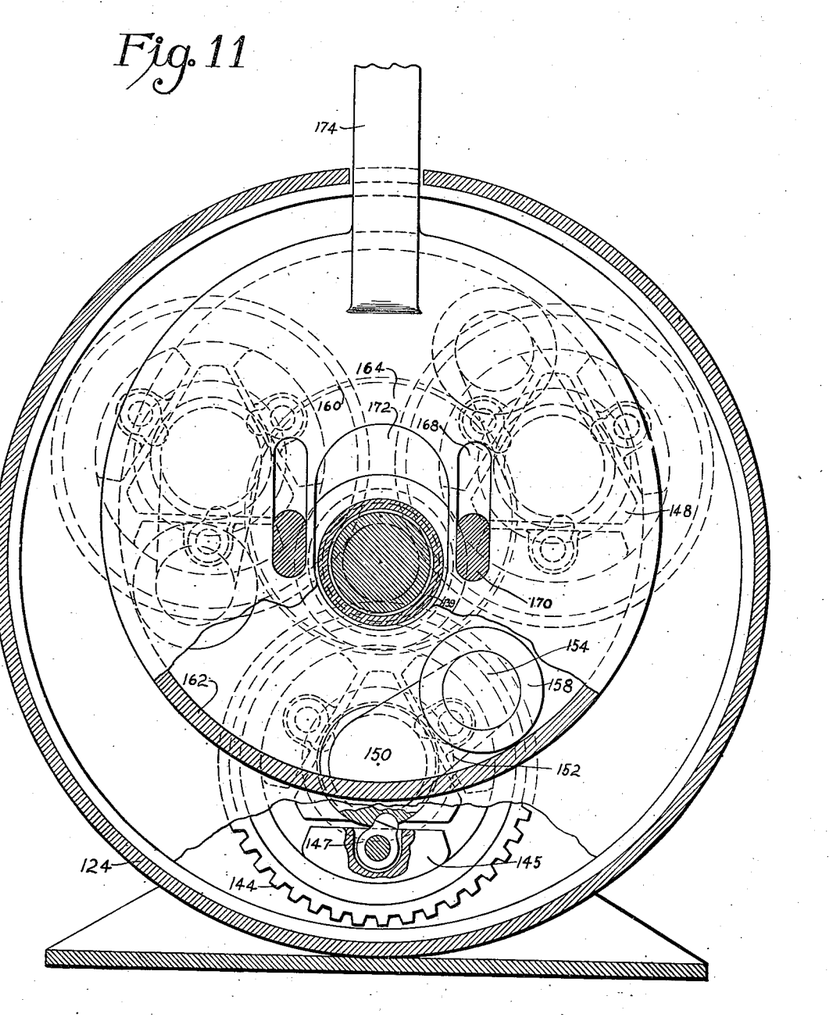
Fig. 11 is a cross-sectional view of the elements of the transmission taken along the plane 11—11 indicated in Fig. 7.

In the second preferred embodiment of the invention, a source of power is applied to shaft 134. The rotation of shaft 134 causes the rotation of drums 136 and 138 which are rotatable with shaft 134. If the cams 164 and 166 are in the neutral position, the rotation of drums 136 and 138 will not affect the rotatable shaft 178. To operate the device it is necessary only to move extension 174 or extension 176. One of these extensions controls forward speeds, and the other controls the speeds in reverse. If extension 174 is moved, the rollers 156 and 158 rotatable with drum 136 will move back and forth with respect to the axis of rotation of that drum. This motion imparts a rocking motion to the rocker arms 152 carried by the drum and causes the oscillation of cams 148. The oscillation of cams 148 results in the intermittent application of driving shoes 145 to the driving surface of gears 144. The intermittent application of power to the gears 144 causes the rotation thereof and the rotation of shaft 178 by the engagement between gear 146, which is mounted on the shaft 178, and gears 144. If extension 176 is moved, the rollers rotatable with drum 138 will move back and forth with respect to the axis of rotation of that drum. This motion imparts a rocking motion to the rocker arms, that results in the intermittent application of power to the gears 144. This intermittent application of power to the gears 144 causes a rotation of shaft 178 in the direction opposite to the rotation induced when extension 174 is moved.

The drums 136 and 138 are so connected to shaft 178 that shaft 178 and the drums 136 and 138 form a planetary gear train. Because of this it is possible to brake the transmission by moving the extensions from forward to reverse and vice versa. If, for instance, extension 174 was in the operating position and it was desired to stop the device, the extension 174 would be moved out of operating position and extension 176 would be moved into operating position. The movement of extension 174 would halt the application of force to shaft 178 and the movement of extension 176 would start the application of force in the opposite direction to shaft 178. This would cause the rapid deceleration of the shaft 178.

A transmission made in accordance with the teachings of this invention could be used either with a constant speed source of power or a variable speed source of power, to provide speeds from one revolution per minute to crankshaft speed or greater merely by moving a lever.

What we claim is:

1. A variable speed transmission comprising a plurality of driving drums, a driven shaft, gear portions rotatable with the driven shaft, a set of annular gears positioned in each driving drum adapted to engage a gear portion that rotates with the driven shaft, clutches positioned in the annular gears adapted to apply force to the driven shaft when rotated in one direction and permit free movement of the driven shaft when rotated in the opposite direction, the clutches in one set of annular gears being arranged to rotate the driven shaft in one direction and the clutches in the other set of annular gears being arranged to rotate the driven shaft in the opposite direction, rocker arms and cam followers operating the clutches, and a plurality of cams of adjustable eccentricity that are adapted to actuate the cam followers and rocker arms.

2. A variable speed transmission comprising a plurality of driving drums, a driven shaft, gears rotatable with the driven shaft, a set of annular gears positioned in each driving drum adapted to engage the gears that rotate with the driven shaft, clutches positioned in one set of annular gears adapted to rotate the driven shaft in one direction, clutches positioned in the other set of annular gears adapted to rotate the driven shaft in the opposite direction, rocker arms and cam followers operating the clutches, and a plurality of cams of adjustable eccentricity that are adapted to actuate the rocker arms and cam followers.

3. A variable speed transmission comprising a plurality of driving drums rigidly secured to and rotatable with each other, a driven shaft, gears rotatable with the driven shaft, a set of annular gears positioned in each of the driving drums adapted to engage one of the gears rotatable with the driven shaft, a clutch positioned in each of the annular gears that is adapted to impart a uni-directional rotation thereto, the clutches in the gears of one driving drum being adapted to rotate the driven shaft in one direction, the other clutches being adapted to rotate the driven shaft in the opposite direction, rocker arms and cam followers actuable to operate the clutches, and a plurality of cams of adjustable eccentricity that are adapted to actuate the cam followers and rocker arms.

4. A variable speed transmission comprising a rotatable driving drum, a plurality of sets of annular gears positioned in and rotatable with said driving drum, a driven shaft having gear portions engaging the annular gears, clutches positioned in the annular gears that are adapted to impart a uni-directional rotation to the annular gears, the clutches in at least one of the sets of annular gears being adapted to rotate the driven shaft in one direction and other clutches being arranged to rotate the driven shaft in the opposite direction, rocker arms and cam followers to operate the clutches, and a plurality of cams that are adapted to actuate the cam followers and rocker arms, said cams being movable radially with respect to the axis of rotation of the driving drum.

5. A transmission, adapted to give forward or reverse speeds from zero to maximum speed, that comprises a rotatable driving drum, a plurality of sets of annular gears positioned in and rotatable with the driving drum, a driven shaft having gear portions in engagement with the annular gears, clutches positioned in the annular gears to impart a uni-directional rotation to the annular gears, a portion of said clutches being adapted to rotate the driven shaft in one direction, other clutches being adapted to rotate the driven shaft in the opposite direction, and driving means for the clutches comprising a plurality of cams of adjustable eccentricity, cam followers and rocker arms movable with the clutches, said sets of annular gears cooperating with the driven shaft and the driving drum to form a planetary gear train.

6. A variable speed transmission comprising a driving drum, a driven shaft, gears rotatable with the driven shaft, two sets of annular gears positioned in the driving drum adapted to engage the gears that rotate with the driven shaft, clutches positioned in one set of annular gears adapted to rotate the driven shaft in one direction, clutches positioned in the other set of annular gears adapted to rotate the driven shaft in the opposite direction, a plurality of cams of adjustable eccentricity, and means secured to and movable with the clutches in the annular gears, said means engaging the cams of adjustable eccentricity and being actuated thereby.

GEORGE O. JOYNER.
DONALD SCOTT MYERS.